(12) United States Patent
Bachmutsky et al.

(10) Patent No.: US 6,633,548 B2
(45) Date of Patent: Oct. 14, 2003

(54) METHOD AND APPARATUS FOR TERNARY CONTENT ADDRESSABLE MEMORY (TCAM) TABLE MANAGEMENT

(75) Inventors: Alex Bachmutsky, San Jose, CA (US); Vijay Chandler, Santa Clara, CA (US); Chi Fai Ho, Sunnyvale, CA (US); Henry Tzeng, Cupertino, CA (US)

(73) Assignee: Nokia Intelligent Edge Routers Inc., Mountain View, CA (US)

( * ) Notice: Subject to any disclaimer, the term of this patent is extended or adjusted under 35 U.S.C. 154(b) by 137 days.

(21) Appl. No.: 09/773,051

(22) Filed: Jan. 30, 2001

(65) Prior Publication Data

US 2002/0131432 A1 Sep. 19, 2002

(51) Int. Cl.⁷ ......................... H04L 12/28; G06F 15/173
(52) U.S. Cl. ....................................... 370/255; 370/400
(58) Field of Search ................................ 370/254, 255, 370/389, 392, 393, 400–406; 709/238, 242; 711/205, 206, 207

(56) References Cited

U.S. PATENT DOCUMENTS

| | | | |
|---|---|---|---|
| 6,018,524 A | | 1/2000 | Turner et al. |
| 6,289,414 B1 | * | 9/2001 | Feldmeier et al. ........... 711/108 |
| 6,457,061 B1 | * | 9/2002 | Bal et al. ..................... 709/245 |
| 6,490,279 B1 | * | 12/2002 | Chen et al. .................. 370/392 |
| 6,546,391 B1 | * | 4/2003 | Tsuruoka ........................ 707/8 |

OTHER PUBLICATIONS

PCT Notification of Transmittal of The International Search Report or The Declaration for PCT Counterpart Application No. PCT/US02/01948 Containing International Search Report (Jan. 22, 2003).

Tsunemasa Hayashi and Toshiaki Miyazaki, "High–Speed Table Lookup Engine for Ipv6 Longest Prefix Match," XP–001016968, 1999 IEEE Global Telecommunications Conference—Globecom '99, vol. 2, pp. 1576–1581 (Dec. 5, 1999).

MUSIC Semiconductors, Application Brief AB–N6 "What Is A CAM (Content–Addressable Memory)?" Sep. 30, 1998 Rev. 2a, Hackettstown, New Jersey 07840.

MUSIC Semiconductors, Application Brief AB–N13 "A New Epoch in IP Networking" May 5, 1999 Rev.0, Santa Clara, California 95054.

NetLogic Microsystems, Application Note NCS018, "A Basic Controller For The CIDR Co–Processor TM Longest Prefix Match Engine" Jul. 2000, Mountain View, CA 94043.

Co–Processor TM Longest Prefix Match Engine Jul. 2000, Mountain View, CA 94043.

Ichiriu, Mike, "High Performance Layer 3 Forwarding *The Need for Dedicated Hardware Solutions*," NetLogic Microsystems White Paper (2000).

(List continued on next page.)

*Primary Examiner*—Chau Nguyen
*Assistant Examiner*—Nhat Do
(74) *Attorney, Agent, or Firm*—Blakely, Sokoloff, Taylor & Zafman LLP

(57) ABSTRACT

A method and a system for managing a TCAM table are disclosed. A new route is inserted into the TCAM table at an available location using an index. The new route is added into a Patricia tree organized by a mask length associated with the new route. Routes having common prefixes with the new route are searched for in Patricia trees organized by longer mask lengths and in Patricia trees organized by shorter mask lengths to locate a chain for the new route. The chain for the new route groups routes having common prefixes. The routes in the chain are sequenced in an order of longer prefix first such that a route at a top of the chain has a longest prefix. A swap of routes in the chain is performed to accommodate the new route and to maintain the longer prefix first order.

13 Claims, 5 Drawing Sheets

OTHER PUBLICATIONS

"Advantages of CAM in ASIC–Based Network Address Processing," Music Semiconductors, Application Brief AB–N11, Rev. 1.2A Draft (Sep. 30, 1998).

"Using the 128–bit Wide Ternary IPCAM for 64–bit Applications," Netlogic Microsystems, Application Note NCS08, Rev. 1.0 (date prior to Jan. 30, 2001).

"Using the Ternary NL82721 IPCAM™ for Longest Prefix Match," Netlogic Microsystems, Application Note NCS05, Rev. 1.2 (date prior to Jan. 30, 2001).

"Using the Ternary NL82721 IPCAM™ for Subnet Masking," Netlogic Microsystems, Inc, Application Note NCS04, Rev. 1.0 (date prior to Jan. 30, 2001).

* cited by examiner

METHOD AND APPARATUS FOR TERNARY CONTENT ADDRESSABLE MEMORY (TCAM) TABLE MANAGEMENT

FIELD OF THE INVENTION

The present invention relates generally to field of network addressing. More specifically, the present invention is directed to a method and an apparatus for managing a ternary content addressable memory (TCAM) table.

BACKGROUND

Internet Protocol (IP) is a source route type of network where forwarding is made based on a destination Internet address. Address forwarding is made on a hop-by-hop basis. The destination address is looked up in a routing table to determine where a next hop is. The packet is then forwarded to the next hop. A routing protocol is used to make sure that as the packet travels through the network it will eventually reaches its destination.

The growth of the Internet causes routing tables to grow faster than the router technology. The router would have to keep millions of entries in its database corresponding to the millions of computers on the Internet. The look up process of the destination address in the routing table is an important part of the IP forwarding process. One of the Internet protocols is IP version 4 ("IPv4"). The address space for the IPv4 is 32 bits wide. Under the IPv4, there are two schemes of IP addresses. One IP address scheme is "classful", while another IP address scheme is "classless". Each IP or Internet address comprises a network id and a host id. The network id identifies the network on which the host resides. The network id is sometimes referred to as a network prefix. The host id identifies the particular host on the given network. The classful IP address scheme comprises multiple classes: A, B, C, D and E. Under class A, the network id is 8 bits wide, and the host id is 24 bits wide. Under class B, the network id is 16 bits wide, and under class C the network id is 24 bits wide. Each of the classes is used to support different size networks having different number of hosts. Network ids of all zeroes and all ones are reserved for default route and loop back function respectively. Class D is used for multicast, and class E is reserved. The classful IP address scheme does not efficiently accommodate different sizes of networks. Routers in the "old style" networks generally use the classful IP address scheme.

The classless IP address scheme is often referred to as CIDR ("classless inter-domain routing"). Basically, CIDR eliminates the concept of class A, B, and C networks and replaces this with an IP address prefix. CIDR can be used to perform route aggregation in which a single route can cover the address space of several "old-style" network numbers and thus replaces a lot of the old routes. CIDR makes it possible to utilize the available address space more efficiently and allows for continuous, uninterrupted growth of the Internet. Newer routers use the CIDR address scheme.

IP packet forwarding is processed at each router. To accelerate the lookup process, a set of address prefixes is stored as compared to millions of Internet addresses. Route lookup using the address prefixes is referred to as longest prefix match. In longest prefix match, each destination address is a string of 32 bits. The forwarding decision relies on using the destination address and finding an entry having the longest prefix match. The destination address is compared against the set of address prefixes to find a next route to forward the packet. There may be multiple prefix matches, however, the route having the longest prefix match would be selected. The longest match algorithm assumes that the host is part of the network having the longest prefix match.

The traditional lookup process is software based using hashes and trees. There may be multiple lookup per packet. However, as the number of packets increases, faster look up processes are necessary. One hardware lookup approach uses high-speed ternary content-addressable memory (TCAM). TCAM is a memory device that provides fast searches such as looking up for an entry in a route table database. TCAM allows retrieval of a location of a content given a partial content. Thus given a content (e.g., destination address), TCAM provides a location information (e.g., route) to that content. In addition, TCAM allows masking on bit fields and as such can be used to determine longest prefix matches. Each TCAM memory location has a corresponding mask register. A "1" in the mask register forces a match on the corresponding bit in the TCAM memory location where an address of a next hop for a next route is pre-stored. The prefix is stored in the mask register.

Management of the TCAM memory ("TCAM table") is essential to provide the correct longest prefix match in the shortest time.

SUMMARY OF THE INVENTION

A method and a system for managing a TCAM table are disclosed. A new route is inserted into the TCAM table at an available location using an index. The new route is added into a Patricia tree organized by a mask length associated with the new route. Routes having common prefixes with the new route are searched for in Patricia trees organized by longer mask lengths and in Patricia trees organized by shorter mask lengths to locate a chain for the new route. The chain for the new route groups routes having common prefixes. The routes in the chain are sequenced in an order of longer prefix first such that a route at a top of the chain has a longest prefix. A swap of routes in the chain is performed to accommodate the new route and to maintain the longer prefix first order.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
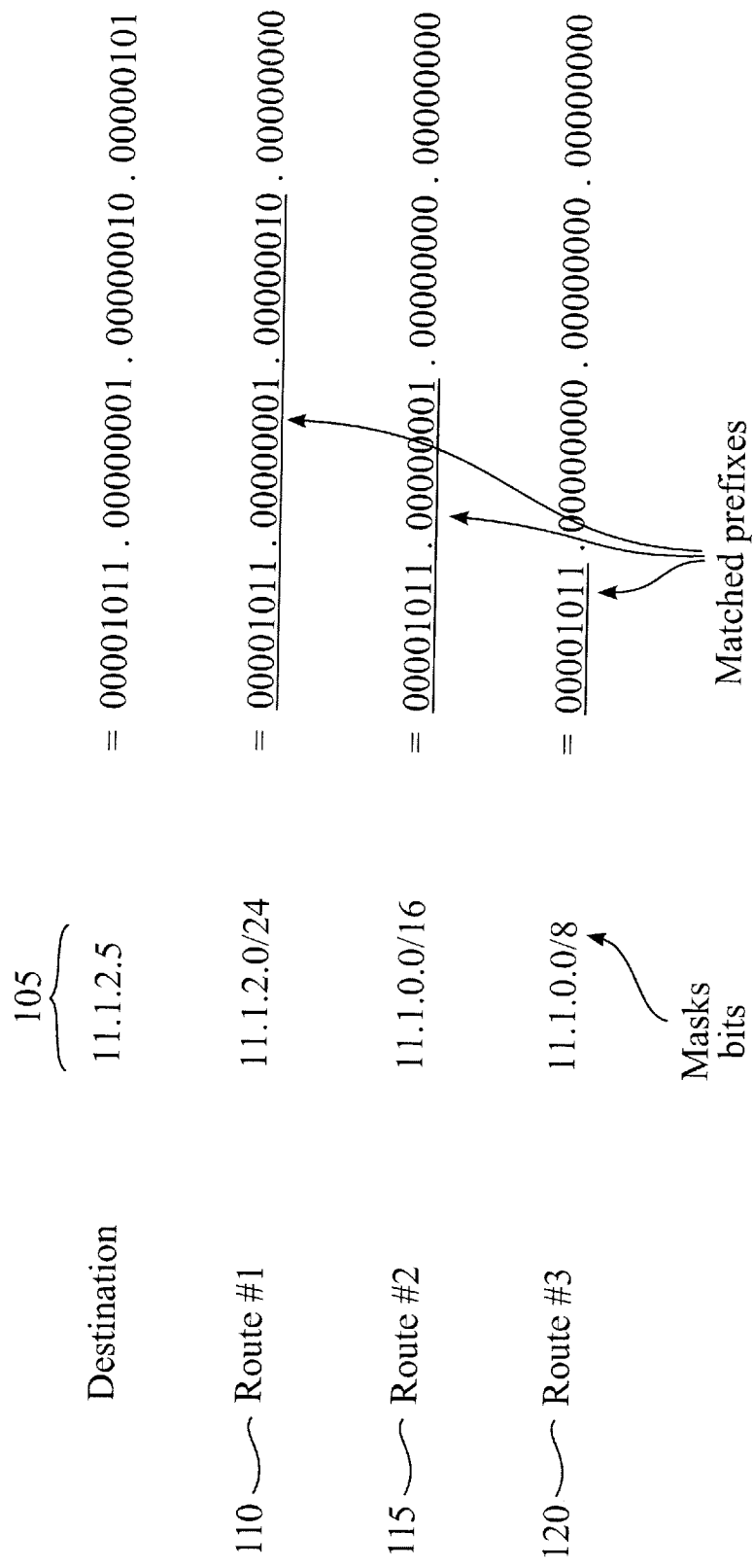
FIG. 1 is an example of longest prefix match operation.

FIG. 1 is an exemplary illustration of a longest prefix match operation. In this example, the destination address 105 (11.1.2.5) is compared against three routes 110, 115 and 120 to find a route with a longest matching prefix. Each route is associated with a mask having a mask length. The binary representation of the destination address 105 and of the masks are shown for bit comparison. For example, the mask for the route 110 is 24 bits long. The mask for the route 115 is 16 bits long, and the mask for the route 120 is 8 bits long. The first 8 bits of the destination address 105 matches with all three masks. The first 16 bits of the destination address match with the masks for the route 119 and the route 115. The first 24 bits of the destination address match only with the mask for the route 110. Since the route 110 provides the longest prefix match with the destination address, the route 110 is selected. Note that multiple comparisons are performed in this example to find the route that has the longest prefix match. This may not be efficient when the number of entries or routes stored in the route table is large. It would be advantageous to be able to locate the route with the longest prefix match in a minimum amount of time.

Figure 2:
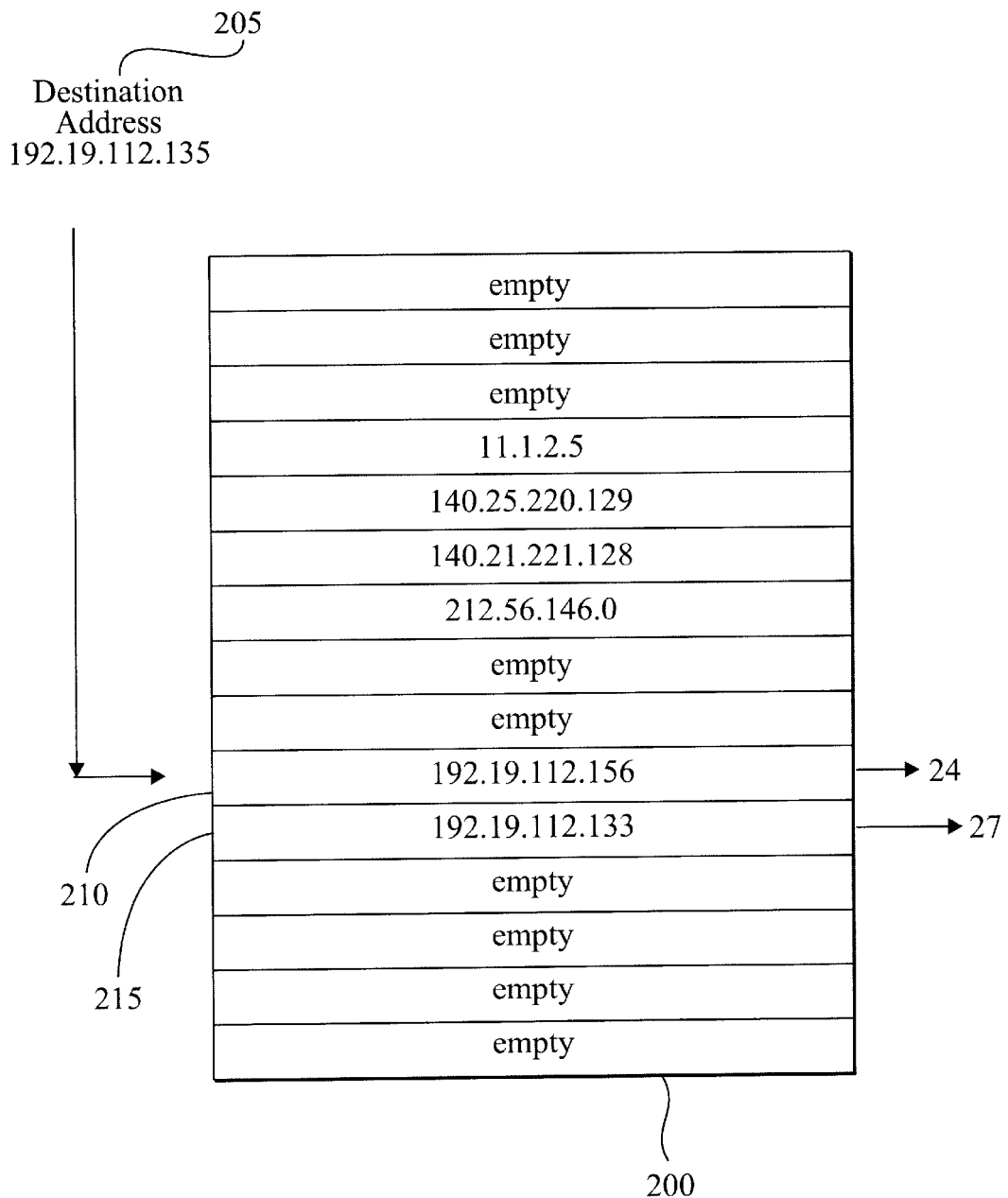
FIG. 2 is an exemplary TCAM table illustrating a longest prefix match.

FIG. 2 is an exemplary TCAM table illustrating a longest prefix match. The routing table is stored in the TCAM. This routing table is referred to as a TCAM table. The TCAM table 200 comprises IP addresses used for forwarding purposes. TCAM allows the comparison described above to be done in one step. Whenever TCAM finds a prefix match, a result is generated.

There are empty spaces in the TCAM table 200 and can be used to insert additional routes. The destination address 205 in this example is 192.19.112.135. As discussed above, each TCAM entry is associated with a mask (not shown). Normally, when the destination address 205 is compared against every entry in the shown in TCAM table 200, the route associated with the entry 215 is selected because it provides the longest prefix match. However, since the comparison by the TCAM is done in such a way that the first route that has a prefix match is produced as the result, the route associated with the entry 210 is selected. This would be an incorrect selection because the mask associated with the entry 210 is only 24 bits long while the mask associated with the entry 215 is 27 bits long. As far as the TCAM is concerned, the TCAM is performing correctly by providing the first match. However, since the software that handles insertion of routes into the TCAM table was incorrect, the result fails to satisfy the longest prefix match requirement. One method of finding the correct longest prefix match is to arrange the entries in the TCAM table so that the entry having the longest mask is placed before those with shorter masks. This way, the first match found by TCAM can be ensured to have the longest prefix. This property is referred to as longest prefix match first.

Figure 3:
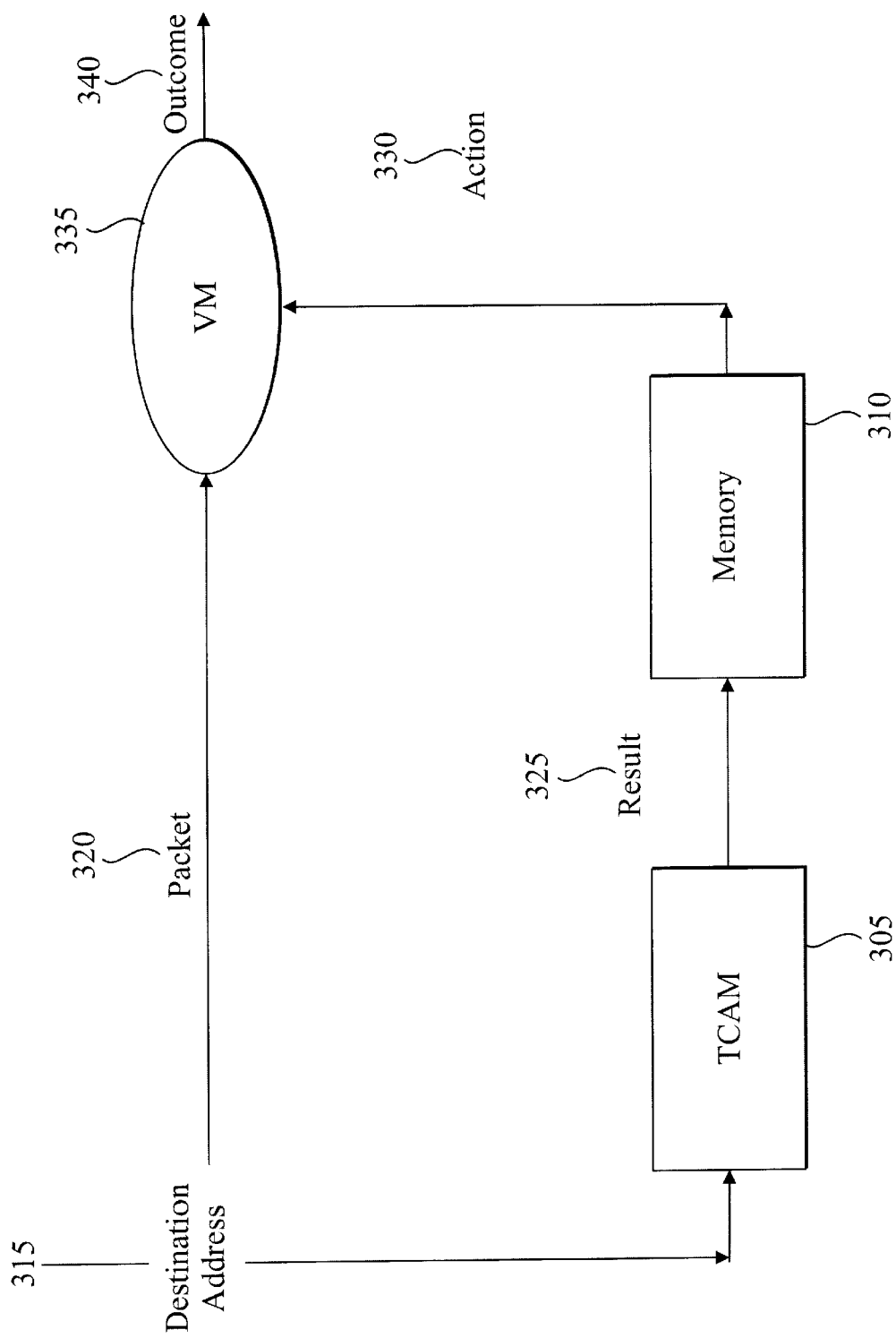
FIG. 3 is an exemplary illustration of a TCAM.

FIG. 3 is an exemplary illustration of a TCAM. The TCAM comprises of a ternary content addressable memory (TCAM) partition 305 and a memory partition 310. With one destination address 315, there may be one or more prefix matches for routes in the TCAM partition 305. When a packet arrives, the destination address is extracted. A lookup is performed by the TCAM 305 to retrieve a result 325. The TCAM 305 uses the masks in comparison operations to select or lookup the result 325 having a longest prefix match. When there is no mask that matches the destination address 315, the packet should not have arrived at this router and it is discarded.

When there is a match, the result 325 is examined. The result 325 needs to be processed before it can be sent out to an interface. The result 325 may be a direct result or IP address. A memory access from the memory 310 is performed to find a meaning of the TCAM result 325. This memory access provides an action 330 that to be performed with the TCAM result 325. The action 330 may include information such as an output port number, an output type, an output connect number, a layer 2 encapsulation information, etc. For example, the action may require chopping the packet into cells for ATM, adding a header for Frame Relay, discarding the result 325, etc. Depending on the action information, the virtual machine 335 performs the action on the packet 320 and sends an outcome 340 out to the interface. The outcome 340 may be a new packet for transmission. It may be nothing because the packet may have been discarded. When this is a router, the result may be an IP address and the action indicates that the packet 320 is to be forwarded to a next hop.

Because there is a direct relationship between a result 325 in the TCAM 305 and an action 330 in the memory 310, it is important to manage the TCAM table such that insertion and deletion operations performed for the TCAM table in the TCAM 305 do not cause any inconsistency with the memory 310. In addition, the TCAM table needs to be arranged in an order such that the longest prefix matching requirement can be performed with minimal delay. Thus, when a new entry is added into the TCAM table, a corresponding entry is added to the memory 310. Similarly, if an entry is removed from the TCAM table, another corresponding entry is to be removed from the memory 310. The order to insert entries into the TCAM table and into the memory 310 is important to avoid inconsistency.

Generally, for insertion, the memory 310 is updated first and then the TCAM table. For deletion, the TCAM table is deleted first and the deletion of the memory 310 is optional. However, when an insertion is to be done at a location in the TCAM table that is already occupied, a collision occurs. When there is a collision, moving or swapping several TCAM table entries are necessary. These swapping operations present a potential issue of mismatch or inconsistency between the entries in the TCAM table and in the memory 310.

Figure 4:
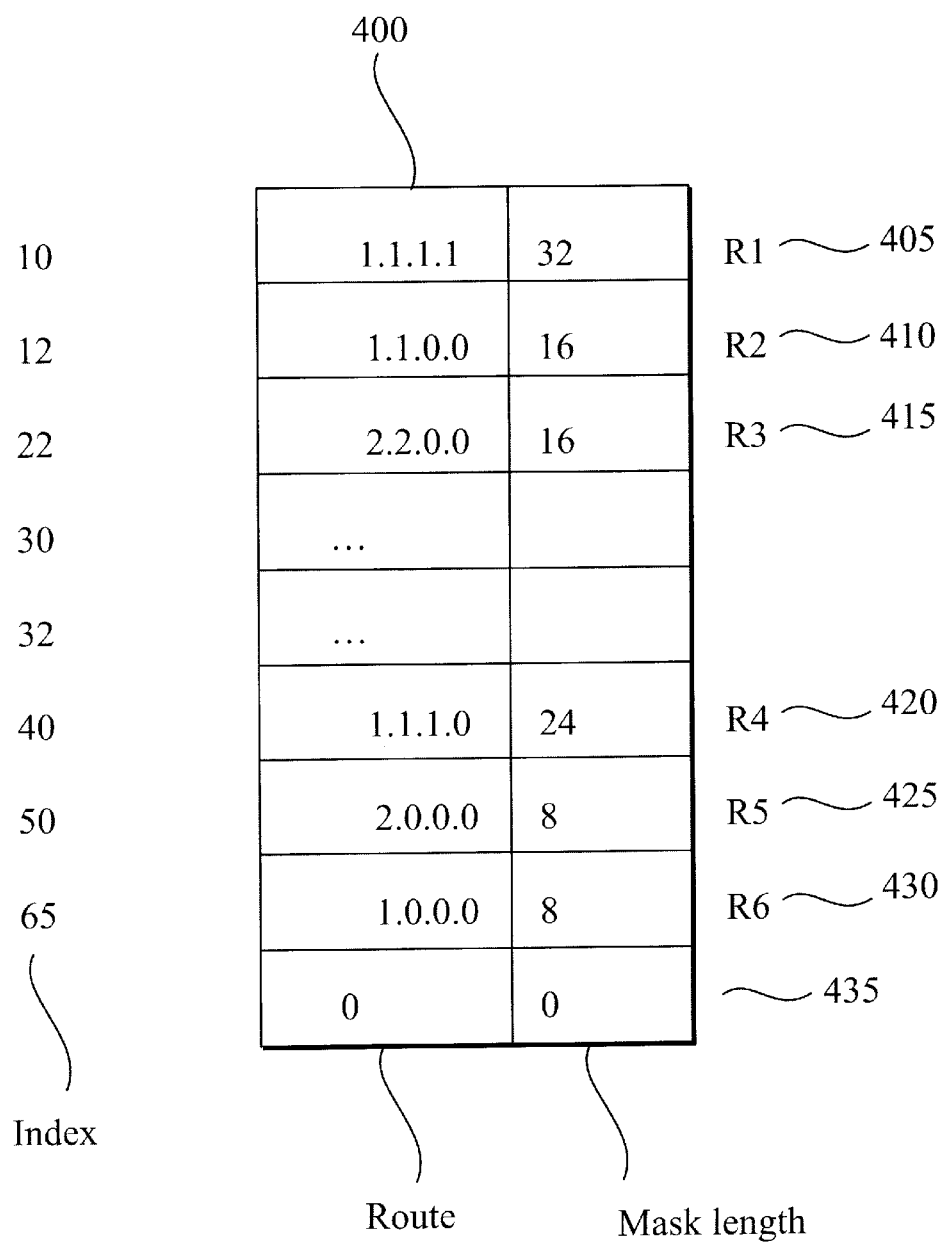
FIG. 4 is an exemplary illustration of route chains.

FIG. 4 is an exemplary illustration of route chains. The TCAM table comprises addresses and their corresponding masks. The table 400 in FIG. 4 lists the addresses (routes) and their associated mask length. The mask lengths are determined from the masks. Each route is identified by its index number. For example, index number 10 in the TCAM table 400 is occupied by route 405.

Index number 30 and 32 correspond to empty locations in the TCAM table 400. In one embodiment of the present invention, routes that have the same prefixes are grouped together in a chain. For example, routes 405, 410, 420 and 430 have similar prefixes at the first 8 bits. Routes 415 and 425 have similar prefixes at the first 8 bits. Thus starting from the top of the table 400, the first chain is R1→R2→R4→R6, and the second chain is R3→R5, where a route from a chain is selected from left to right. Thus, for the first chain, R1 would be selected before R2, and R2 would be selected before R4. The chains may be implemented using a link list data structure.

The two chains are independent of each other. If there were only these two chains, then a valid destination address would match one of the routes in the first chain or one of the routes in the second chain. An invalid destination address would only get a match for route 435 and would be discarded. The first chain R1→R2→R4→R6 has R2 before R4 even though R4 has a longer prefix match than R2. In one embodiment, the chains need to be maintained in an order such that a longest prefix match can be selected with a first match. Thus, a better order for the first chain would be R1→R4→R2→R6. This would allow the first match to be the longest prefix match.

The first chain has a length of four because it comprises four routes. The second chain has a length of two because it comprises two routes. The maximum length a chain can have is 32. This is because as the number of bits in the mask increases one bit at a time, the prefix becomes shorter. The minimum length a chain can have is 1 where there is no other route having a common prefix. Thus, a chain may start with a route having a 32-bit prefix and may end with a route having a one-bit prefix. All the routes in a chain have a common prefix of at least one bit. Thus, a chain is the sequence of routes from the longest prefix to shortest prefix for a particular set of prefixes, which are related. It is important to note that the order of routes in the chain needs to be preserved when the TCAM is programmed with new routes to satisfy the longest prefix match requirement. Since it is known that a chain can have a maximum of 32 routes, time required to perform any reordering of the chain would not exceed a certain fixed maximum. This is advantageous because the fixed maximum time remains the same regardless of the size of the TCAM table. Thus, the chains capture the longest prefix match order.

In one embodiment of the present invention, each of the routes in the TCAM table having the same mask length is associated each other. For example, all of the routes that are associated with masks having mask length of 24 bits belong to one group and all of the routes that are associated with masks having mask length of 16 bits belong to a different group. When the IP address is 32 bits long, there are 32 groups, each associated with a mask length from one bit to 32 bits. Similarly, when the IP address is 128 bits long (as in IP version 6), there are 128 groups each associated with a mask length from one bit to 128 bits. Each group is represented as a Patricia ("Practical Algorithm to Retrieve Information Coded in Alphanumeric") tree or P-tree data structure. Thus, there is a maximum of 32 P-trees. A P-tree data structure is a compact representation of a tree where all the children are merged with their parents. The tree stores strings, which there is one node for every common prefix. The strings are stored in extra leaf nodes. One skilled in the art knows characteristics of the P-tree.

Using the P-tree data structure, P-tree-1 ("PT-1") contains all routes having mask length of 1; PT-16 contains all routes having mask length of 16, PT-32 contains all routes having mask length of 32 bits, etc. Thus, referring to FIG. 4, route 410 (R2) and route 415 (R3) are in the same PT-16. Similarly, route 425 (R5) and route 430 (R6) are in the same PT-8. Route 405 (R1) is in PT-32, and route 420 (R4) is in PT-24.

In one embodiment, the routes in the same P-tree do not have any order. Thus the P-trees capture all routes having the same mask length. In another embodiment, the routes in the same P-tree are organized in a lexical graphic order.

Figure 5:
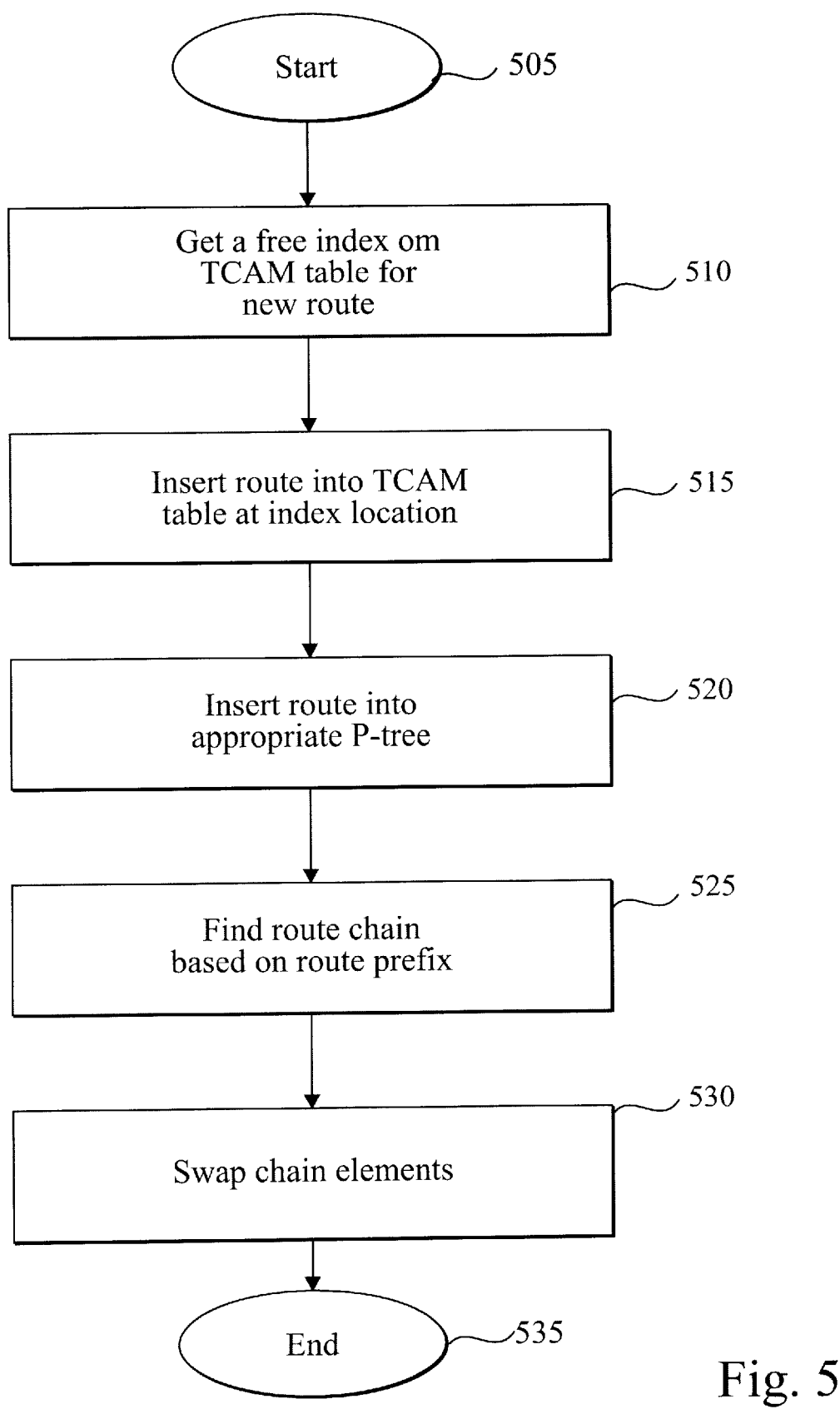
FIG. 5 is an exemplary flow diagram illustrating a process of inserting a new route into a TCAM table in accordance with one embodiment of the present invention.

FIG. 5 is an exemplary flow diagram illustrating a process of inserting a new route into the TCAM table in accordance with the present invention. The process allows the TCAM table to be updated so that consistency can be maintained between the route data in the TCAM and the corresponding action information in the memory. The process starts at block 505 with a new route to be inserted into the TCAM table. Each new route has an address ("A") and a mask data ("M"). The route ("R") is represented as a data pair (A/M, index), where index is the index of the route entry in the TCAM table. Each location in the TCAM table is associated with an index. The same index for the location in the TCAM table is used to point to a corresponding location in the memory. For example, the TCAM table may comprises the following routes in an increasing index order:

R1: (1.1.1.1/32, 10)
R2: (1.1.1.0/24, 12)
R3: (1.1.0.0/16, 30)
R4: (1.0.0.0/8, 40)

where each route is represented as (address/mask-length, index-in-TCAM). In this example, a new route R5: (1.128.0.0/9, X) is to be inserted into the TCAM table, where "X" is an unknown index location.

In one embodiment, the index of an empty location in the TCAM is determined on the first available un-used entry in the TCAM table. In another embodiment, the index is determined by first determining the previous prefix, then the first available entry after or before the entry associated with the previous prefix or the first available entry.

At block 510, an empty location in the TCAM table is located using the free index described above. The empty location is used to store the route. Assume that the TCAM table location at index 11 is empty, and the new route R5 is inserted into this location. The representation for the new route R5 is (1.128.0.0/9, 11). This insertion into the TCAM table is shown at block 515. The TCAM table now comprises of the following entries:

R1: (1.1.1.1/32, 10)
R5: (1.128.0.0/9, 11)
R2: (1.1.1.0/24, 12)
R3: (1.1.0.0/16, 30)
R4: (1.0.0.0/8, 40)

As discussed above, a chain is the sequence of routes from the longest prefix to shortest prefix for a particular set of prefixes that are related. In this example, after the new route R5 is inserted, the chain is: R1 (1.1.1.1/32, 10)→R5 (1.128.0.0/9, 11)→R2(1.1.1.0/24, 12)→R3(1.1.0.0/16, 30)→R4 (1.0.0.0/8, 40). All routes in the chain have the same first 8 bits. However, the insertion transaction is not completed because the chain is not in the longest prefix match sequence. The current chain has the new route R5 with a mask length of 9 before the routes R2 and R3 even though the routes R2 and R3 have mask lengths of 24 and 16 respectively.

To complete a route insertion transaction, the route chain and the P-tree have to be updated so that the route sequence in the chain is correct. In one embodiment, the TCAm insertion is not atomic. In this embodiment, the invalid bit is set to indicate that the newly inserted route is not immediately usable. After the entire route entry is inserted, the invalid bit is reset to enable the usage of the route.

In one embodiment, the mask length is used to determine the appropriate P-tree to add the new route. For example, when the new route has a mask length of 16, the new route is added to the PT-16 tree. At block 520, the route is inserted into the P-tree based on the mask length associated with the route. This route insertion may be represented as: R (A, M)→PT (|M|), where R(A, M) is the route and |M| is the mask length.

At block 525, a route chain having matched prefix with the route is searched. As discussed above, when the IP address is 32 bits long, there is at most 32 P-trees. It may be possible that not all of the 32 P-trees are occupied. As discussed above, the P-trees capture all routes having the same mask length Thus to find routes having longer prefixes than the new route, a search is done with the P-trees having higher order of mask bits. Similarly, to find routes having shorter prefixes than the new route, a search is done with the P-trees having lower order of mask bits. For example, when the route is to be added to PT-16, routes in PT-17 to PT-32 (i.e., (PT(|M|)+1) to PT-32) are searched for matched prefixes. Similarly, routes in PT-1 to PT-15 (i.e., PT(|M|)–1 to PT-1) are searched for matched prefixes. Thus, in this example, there are at most 31 P-trees to search for the routes having common prefixes.

For each of the routes having the common prefix with the new route, a determination is made to see if the order of the routes in the chain is according to the order of longest prefix match first. When this is not the case, a swap of the routes in the chain and a swap of the routes in the TCAM table are performed, as shown in block 530. In the current example, the new route R5 has a mask length of 9 and is placed at index 11 of the TCAM table. A search of routes having common prefixes with the new route R5 is done with P-trees having shorter mask lengths (i.e., PT-1 to PT-8).

There is only one route (R4) that has a shorter mask length (8) and is located at index location 40. A comparison of the index locations of R5 and R4 is done to see if the two routes need to be swapped. If R4 has an index location that is lower than R5, then a swap is done to maintain an increasing index order and thus a longest prefix match first order. In this example, since the index of R5 (11) is lower than the index of R4 (40), a swap is not required. Thus, based on the increasing index order, the routes in the chain are in the following order: R1 (1.1.1.1/32, 10)→R5(1.128.0.0/9, 11)→R2(1.1.1.0/24, 12)→R3(1.1.0.0/16, 30)→R4 (1.0.0.0/ 8, 40)

A search of routes having common prefixes with the new route R5 is done with P-trees having longer mask lengths (i.e., PT-10 to PT-32). In the current example, the route R3 (16) has a longer prefix than the new route R5 (9). Since the index for the route R3 is 30 and the index for the new route R5 is 11, the two routes are out of order and a swap is necessary to preserve the longest prefix match order. After swapping R3 and R5, the routes in the chain are in the following order: R1(1.1.1.1/32, 10)→R3(1.1.0.0/16, 11)→R2(1.1.1.0/24, 12) →R5(1.128.0.0/9, 30)→R4 (1.0.0.0/8, 40)

In addition, the route R2 has a longer mask length than the route R3. The mask length for the route R2 is 24 while the mask length for the route R3 is 11. Thus, a swap of these two routes R2 and R3 are necessary to maintain the longest prefix match first order. After swapping R2 and R3, the routes in the chain are in the following order: R1 (1.1.1.1/32, 10)→R2 (1.1.1.0/24, 11)→R3(1.1.0.0/16, 12)→R5 (1.128.0.0/9, 30)→R4(1.0.0.0/8, 40). The route R3 is inserted into its new index location 12 in the TCAM table, and the route R2 is inserted into its new index location 11 in the TCAM table.

The process of the flow diagram in FIG. 5 ends at block 535. In the current example, the final route sequence at the end of the insertion transaction is: R1(1.1.1.1/32, 10)→R2 (1.1.1.0/24, 11)→R3(1.1.0.0/16, 12)→R5(1.128.0.0/9, 30)→R4(1.0.0.0/8, 40).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:

inserting a new route into a ternary content-addressable memory (TCAM) table at an available location using a first index, the new route having a mask length, the new route grouped in a Patricia tree (P-tree) having one or more routes having the same mask length;

finding a route having a common prefix with the new route, the route having the common prefix grouped in a P-tree having a different mask length than the new route, the route having the common prefix placed in a second index in the TCAM table, wherein the route having the common prefix is grouped in a chain of one or more routes having the same common prefix, the routes in the chain sequenced in an order such that a route having a longer prefix is located at a lower index in the TCAM table than a route having a shorter prefix, wherein a route in the chain at a lowest index is the route with the longest prefix; and inserting the new route into the chain based on the mask length of the new route and based on the first index such that the chain maintains the order such that that a route having a longer prefix is located at a lower index in the TCAM table than a route having a shorter prefix.

2. The method of claim 1, wherein finding the route having the common prefix with the new route comprises searching for the route in P-trees having longer mask lengths and in P-trees having shorter mask lengths than the mask length of the new route.

3. The method of claim 1, wherein inserting the new route into the chain based on the mask length of the new route and based on the first index comprises comparing the mask length of the new route with the mask length of the route having the common prefix, wherein when the mask length of the new route is longer than the mask length of the route having the common prefix and the first index is higher than the second index, the locations of the new route and the route having the common prefix in the TCAM table are swapped.

4. An apparatus, comprising:

logic to insert a new route into a ternary content-addressable memory (TCAM) table at an available location using a first index, the new route having a mask length, the new route grouped in a Patricia tree (P-tree) having one or more routes having the same mask length;

logic to find a route having a common prefix with the new route, the route having the common prefix grouped in a P-tree having a different mask length than the new route, the route having the common prefix placed in a second index in the TCAM table, wherein the route having the common prefix is grouped in a chain of one or more routes having the same common prefix, the routes in the chain sequenced in an order such that a route having a longer prefix is located at a lower index in the TCAM table than a route having a shorter prefix, wherein a route in the chain at a lowest index is the route with the longest prefix; and logic to insert the new route into the chain based on the mask length of the new route and based on the first index such that the chain maintains the order such that that a route having a longer prefix is located at a lower index in the TCAM table than a route having a shorter prefix.

5. The apparatus of claim 4, wherein the logic to find the route having the common prefix with the new route comprises logic to search for the route in P-trees having longer mask lengths and in P-trees having shorter mask lengths than the mask length of the new route.

6. The apparatus of claim 4, wherein the logic to insert the new route into the chain based on the mask length of the new route and based on the first index comprises logic to compare the mask length of the new route with the mask length of the route having the common prefix, wherein when the mask length of the new route is longer than the mask length of the route having the common prefix and the first index is higher than the second index, the locations of the new route and the route having the common prefix in the TCAM table are swapped.

7. An apparatus comprising:

means for inserting a new route into a ternary content-addressable memory (TCAM) table at an available location using a first index, the new route having a mask length, the new route grouped in a Patricia tree (P-tree) having one or more routes having the same mask length;

means for finding a route having a common prefix with the new route, the route having the common prefix grouped in a P-tree having a different mask length than the new route, the route having the common prefix placed in a second index in the TCAM table, wherein the route having the common prefix is grouped in a chain of one or more routes having the same common prefix, the routes in the chain sequenced in an order such that a route having a longer prefix is located at a lower index in the TCAM table than a route having a shorter prefix, wherein a route in the chain at a lowest index is the route with the longest prefix; and means for inserting the new route into the chain based on the mask length of the new route and based on the first index such that the chain maintains the order such that that a route having a longer prefix is located at a lower index in the TCAM table than a route having a shorter prefix.

8. The apparatus of claim 7, wherein means for finding the route having the common prefix with the new route comprises means for searching for the route in P-trees having longer mask lengths and in P-trees having shorter mask lengths than the mask length of the new route.

9. The apparatus of claim 7, wherein means for inserting the new route into the chain based on the mask length of the new route and based on the first index comprises means for comparing the mask length of the new route with the mask length of the route having the common prefix, wherein when the mask length of the new route is longer than the mask length of the route having the common prefix and the first index is higher than the second index, the locations of the new route and the route having the common prefix in the TCAM table are swapped.

10. A computer readable medium having stored thereon sequences of instructions which are executable by a digital processing system, and which, when executed by the digital processing system, cause the system to perform a method comprising:

inserting a new route into a ternary content-addressable memory (TCAM) table at an available location using a first index, the new route having a mask length, the new route grouped in a Patricia tree (P-tree) having one or more routes having the same mask length;

finding a route having a common prefix with the new route, the route having the common prefix grouped in a P-tree having a different mask length than the new route, the route having the common prefix placed in a second index in the TCAM table, wherein the route having the common prefix is grouped in a chain of one or more routes having the same common prefix, the routes in the chain sequenced in an order such that a route having a longer prefix is located at a lower index in the TCAM table than a route having a shorter prefix, wherein a route in the chain at a lowest index is the route with the longest prefix; and inserting the new route into the chain based on the mask length of the new route and based on the first index such that the chain maintains the order such that that a route having a longer prefix is located at a lower index in the TCAM table than a route having a shorter prefix.

11. The computer readable medium of claim 10, wherein finding the route having the common prefix with the new route comprises searching for the route in P-trees having longer mask lengths and in P-trees having shorter mask lengths than the mask length of the new route.

12. The computer readable medium of claim 10, wherein inserting the new route into the chain based on the mask length of the new route and based on the first index comprises comparing the mask length of the new route with the mask length of the route having the common prefix.

13. The computer readable medium of claim 12, wherein when the mask length of the new route is longer than the mask length of the route having the common prefix and the first index is higher than the second index, the locations of the new route and the route having the common prefix in the TCAM table are swapped.

* * * * *